(12) United States Patent
Hidaka et al.

(10) Patent No.: US 7,594,684 B2
(45) Date of Patent: Sep. 29, 2009

(54) ASSIST GRIP

(75) Inventors: Nobuyuki Hidaka, Wako (JP);
Tatsuhiko Nakamura, Fuji (JP);
Kenichi Kamio, Fuji (JP)

(73) Assignees: Honda Motor Co., Ltd. (JP); Nihon Plast Co., Ltd. (JP)

( * ) Notice: Subject to any disclaimer, the term of this patent is extended or adjusted under 35 U.S.C. 154(b) by 0 days.

(21) Appl. No.: 12/237,881

(22) Filed: Sep. 25, 2008

(65) Prior Publication Data
US 2009/0079233 A1   Mar. 26, 2009

(30) Foreign Application Priority Data
Sep. 25, 2007   (JP) .............................. 2007-247810

(51) Int. Cl.
*B60N 3/02* (2006.01)
(52) U.S. Cl. ..................................... 296/1.02; 16/110.1
(58) Field of Classification Search ................. 296/210, 296/1.02; 16/445, 429, 110.1, 408
See application file for complete search history.

(56) References Cited

U.S. PATENT DOCUMENTS 5,975,606 A * 11/1999 Forbes et al. ............... 296/1.02

2002/0021014 A1 * 2/2002 Sakuma et al. ............... 296/1.1
2004/0140682 A1 * 7/2004 Ito et al. .................... 296/1.02

FOREIGN PATENT DOCUMENTS

JP   2005-343374   12/2005

* cited by examiner

Primary Examiner—Joseph D Pape
(74) Attorney, Agent, or Firm—NDQ&M Watchstone LLP

(57) ABSTRACT

An assist grip includes: a grip member to be gripped by a passenger, the grip member configured to be capable of being pulled out from a retraction position to a grip position; a base member which is fixed to the vehicle and which includes a rotation shaft; a rotation arm pivotally supported so as to be rotatable about the rotation shaft from the retraction position to a pull-out position; retraction biasing element configured to always bias the rotation arm in a retraction direction; and a holding member configured to hold the rotation arm in the pull-out position against a biasing force of the retraction biasing element when the rotation arm is caused to rotate to the pull-out position. In the assist grip, the grip member is rotatably jointed to the rotation arm, and the grip member is provided with a release dog formed therein, the release dog configured to release the rotation arm from being held by the holding member as the grip member is rotated.

4 Claims, 9 Drawing Sheets

ASSIST GRIP

BACKGROUND OF THE INVENTION

1. Field of the Invention

The present invention relates to a retractable assist grip which a passenger uses to keep his/her riding posture in an interior of a vehicle such as an automobile.

2. Description of the Related Art

Heretofore, a vehicle such as an automobile is provided with an assist grip in its interior so that a passenger can use the assist grip to keep his/her riding posture when the vehicle body shakes. In general, an assist grip is installed in the vicinity of a roof-side rail in the vehicle interior, and has a handle shape to provide a comfortable grip for a passenger.

Recently, instead of the ever-fixed assist grip, a pull-out type assist grip has been used. The pull-out type assist grip has a grip member, which is retracted in a housing member while not in use. Depending on the necessity, a passenger pulls out the grip member from the retraction position to use it.

Japanese Patent Application Laid-Open No. 2005-343374 (hereinafter referred to as Patent Document 1) discloses an assist grip having a configuration in which its grip member is rotatable from a retraction position to a grip position. Here, the grip member is in the retraction position while retracted, and is in the grip position allowing a passenger to grip the grip member with fingers, after the passenger pulls out from the retraction position.

The assist grip disclosed in Patent Document 1 includes an alternate type lock system and a spring. The lock system has a function of holding the grip member in the retraction position; and a function of releasing the grip member from being held when the grip member located in the retraction position is further pushed in. The spring is configured to bias the grip member toward the grip position.

In the assist grip disclosed in Patent Document 1, the grip member in the retracted position is unlocked when pushed with fingers, and thereby the grip member is automatically rotates to the grip position by being biased by the spring. This condition allows a passenger to grip the grip member, and thus to keep his/her riding posture even if the vehicle shakes.

However, in the assist grip disclosed in Patent Document 1, the grip member, having a U-shape, is directly attached to the vehicle by use of rotation shafts. Accordingly, the grip member is exposed enough for a passenger to see the whole appearance of a side surface thereof even while retracted in the housing member. Thus, the assist grip disclosed in Patent Document 1 has a problem of having a poor appearance while the grip member is retracted in the housing member.

In addition, the grip member disclosed in Patent Document 1 is directly attached to the vehicle in a manner that two bearing parts extending downward from both end portions of a grip part are attached to the vehicle by use of the two rotation shafts, respectively. For this reason, in order to retract the grip member into the housing member, the grip part of the grip member needs to be rotated to a higher position against a biasing force of the spring. Additionally, after rotated to the higher position, the grip part located there further needs to be pushed into the housing member to be locked by the alternate type lock system. For this reason, the passenger has to extend his/her fingers above the location to which the assist grip is attached. This makes the grip member disclosed in Patent Document 1 difficult to use.

Furthermore, because the assist grip disclosed in Patent Document 1 is of a push-open type using the alternate type lock system, a passenger has to rearrange his/her fingers from when unlocking the grip member to pull out the grip member to when actually griping the grip member. Thus, the assist grip disclosed in Patent Document 1 is not user-friendly.

SUMMARY OF THE INVENTION

The present invention has been achieved with such points in mind.

It therefore is an object of the present invention to provide an assist grip having its grip member to be retracted, when not being in use, into a space part provided in a vehicle interior body, having the fine external appearance while the grip member is retracted, and making pulling-out and retracting operations easy.

To achieve the object, according to a first aspect of the present invention, there is provided an assist grip to be provided in an interior of a vehicle, including: a grip member to be gripped by a passenger, the grip member configured to be capable of being pulled out from a retraction position to a grip position; a base member which is fixed to the vehicle and which includes a rotation shaft; a rotation arm pivotally supported so as to be rotatable about the rotation shaft from the retraction position to a pull-out position; retraction biasing means configured to always bias the rotation arm in a retraction direction; and a holding member configured to hold the rotation arm in the pull-out position against a biasing force of the retraction biasing means when the rotation arm is caused to rotate to the pull-out position, wherein the grip member is rotatably jointed to the rotation arm, and the grip member is provided with a release dog formed therein, the release dog configured to release the rotation arm from being held by the holding member as the grip member is rotated.

According to a second aspect of the present invention, as it depends from the first aspect, there is provided the assist grip further includes engagement biasing means, wherein the holding member is pivotally swingably supported by part of the rotation arm by use of a swing shaft, the base member is provided with a projection part formed therein, the projection part configured to keep the rotation arm held by the holding member by engaging with an engagement part formed in part of the holding member, and the engagement biasing means configured to bias the engagement part toward the projection part.

According to a third aspect of the present invention, as it depends from the first aspect or the second aspect, there is provided the assist grip further includes guide means configured to guide a movement of the grip member while kept in contact with the grip member, when the grip member moves between the retraction position and the grip position with the rotation arm.

In the present invention defined above, when the passenger pulls out the grip member located in the retraction position with fingers, the rotation arm of the assist grip rotates to the pull-out position. Thereby, the rotation arm is held in the pull-out position against the biasing of the retraction biasing means due to the operations of the respective holding members. Thus, the grip member rotatably jointed to the rotation arm is held in the grip position.

When the grip member is to be retracted, the passenger causes the grip member so far gripped by himself/herself to rotate upward. By this operation, the release dogs switch the rotation arm from the condition in which the rotation arm is held by the holding members to a condition in which the rotation arm is rotatable. Thus, the biasing force of the retraction biasing means automatically causes the rotation arm to rotate to the retraction position. Additionally, the grip member jointed to the rotation arm also automatically returns to the retraction position in response to the rotation arm. This makes it easy to pull out and retract the grip member.

While the grip member is retracted, most parts of the grip member are concealed behind the housing part. For this reason, the passenger can only see the top portion of the grip member. Thereby of the assist grip is finished with the fine external appearance while the grip member is retracted. In addition, the grip member rotates downward with the rotation arm. This allows the passenger to grip the grip member at a lower location. Concurrently, this makes it possible to configure the structural body of the assist grip in a compact size.

Moreover, the holding members are pivotally swingably supported by the rotation arm. The engagement parts of the holding members are biased to the projection parts of the base member by use of the engagement biasing means respectively. For this reason, when the rotation arm is caused to rotate to the pull-out position with pulling out the grip member, it is possible to automatically engage the engagement parts with the projection parts, and thus to hold the rotation arm in the pull-out position. Consequently, only by pulling out the retracted grip member to the predetermined position, it is possible to hold the grip member jointed to the rotation arm in the grip position.

On the other hand, when the grip member is retracted, after the passenger causes the grip member so far gripped by himself/herself to rotate upward, the release dogs formed in the grip member release the rotation arm from the held condition in which the rotation arm is held by the holding members, and thus switch the rotation arm to a condition in which the rotation arm is rotatable. Thereby, the grip member returns to the retraction position with the rotation arm.

Furthermore, the assist grip further includes the guide means for guiding a movement of the grip member while kept in contact with the grip member when the grip member moves between the retraction position and the grip position. This makes it possible to reduce the sliding resistance which occurs when the grip member moves, and accordingly allows the grip member to be pulled out and retracted smoothly.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 1 shows how a passenger pulls out the grip member retracted in its retraction position with fingers;

DETAILED DESCRIPTION OF THE PREFERRED EMBODIMENTS

Figure 1:
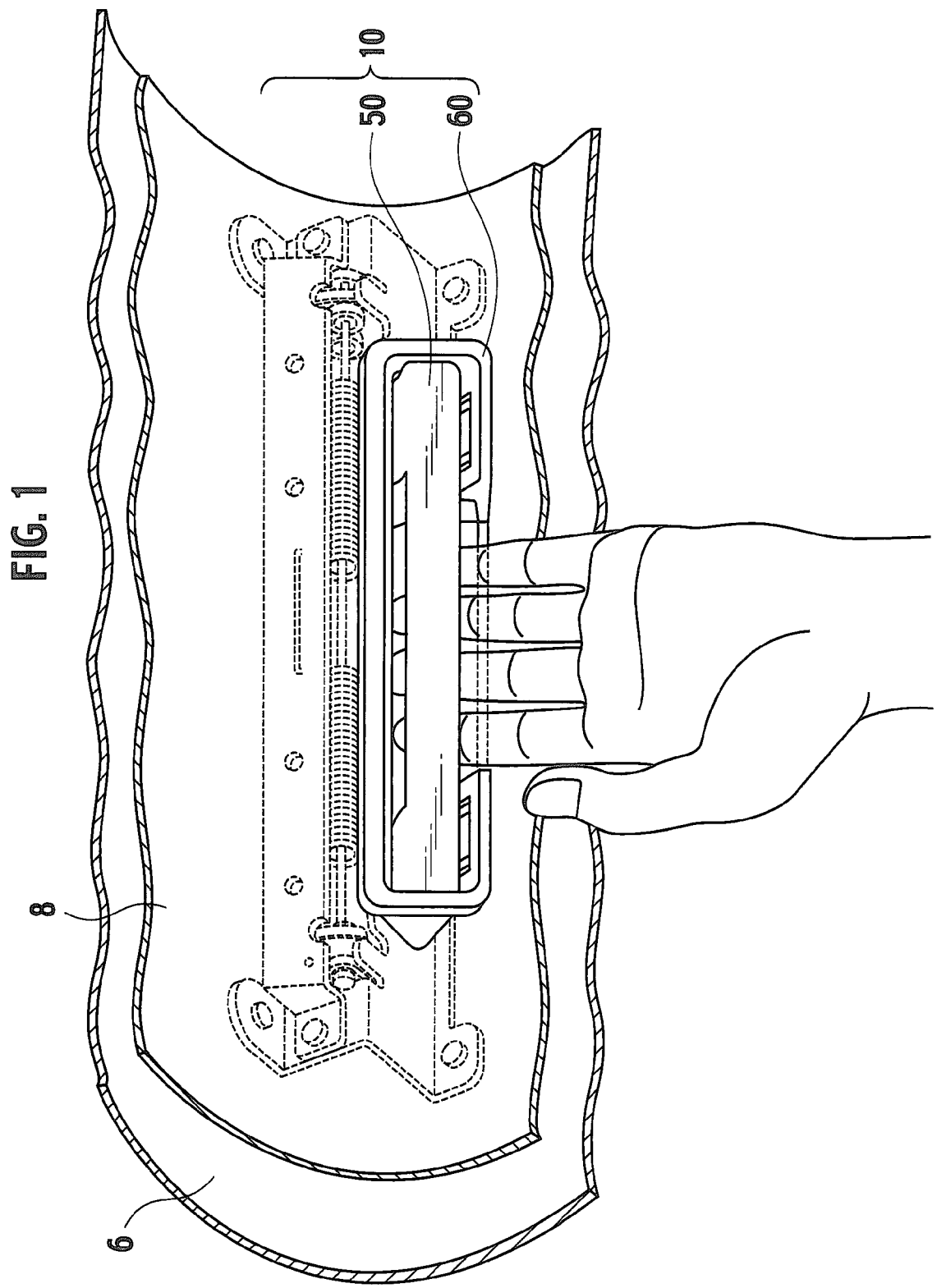
FIG. 1 is an external view of an assist grip, viewed from a vehicle interior, which allows its grip member to be retracted into a space part provided in the rear of a vehicle interior body.

There will be detailed below the preferred embodiments of the present invention with reference to the accompanying drawings. Like members are designated by like reference characters.

Figure 2:
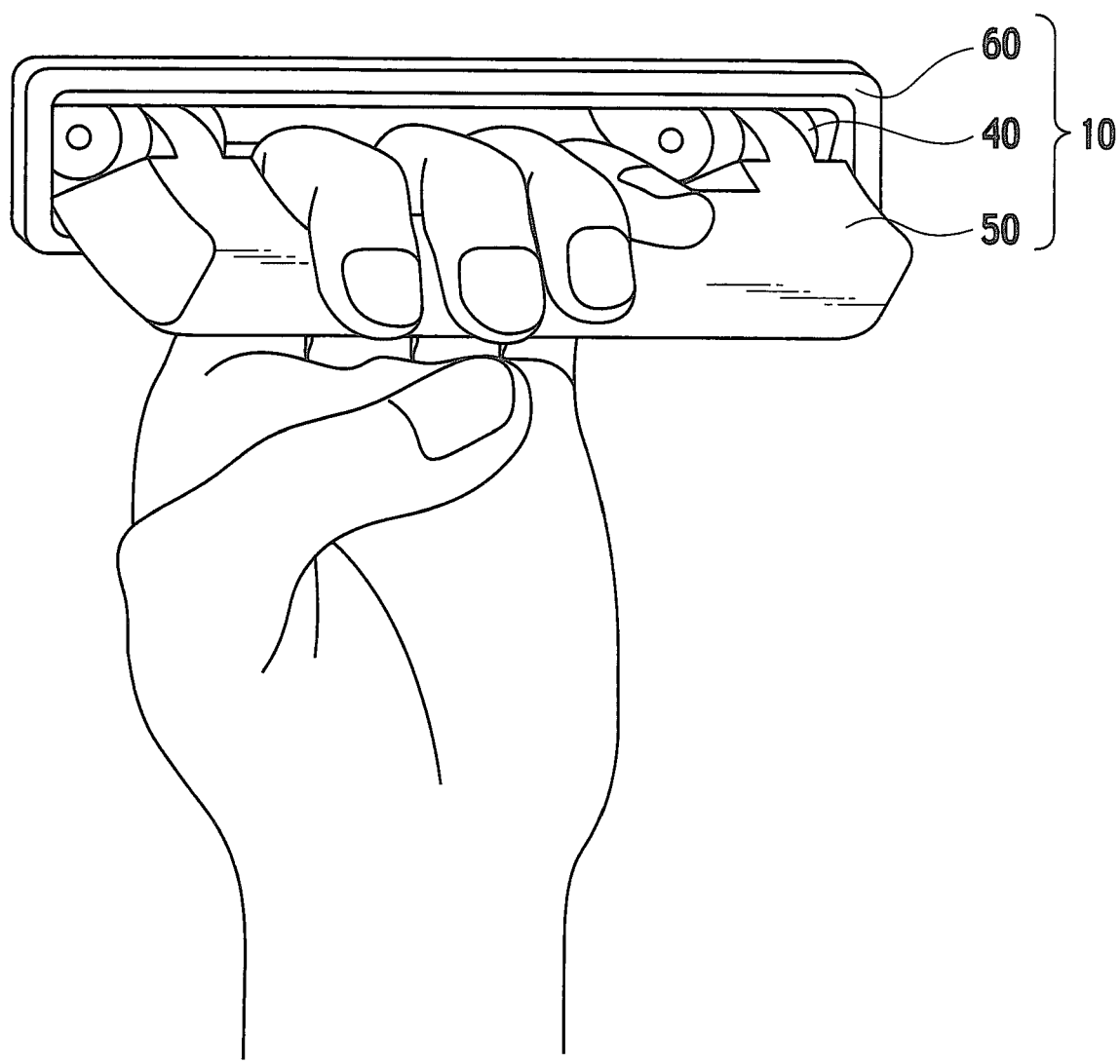
FIG. 2 is an external view showing the grip member of the assist grip shown in FIG. 1 which is pulled out to its grip position.

FIG. 1 is an external view of an assist grip 10, viewed from a vehicle interior, which allows a grip member 50 to be retracted into a space part provided in the rear of a vehicle interior body 8. FIG. 1 shows how a passenger pulls out the grip member 50 retracted in its retraction position with fingers. Note that components recessed in the rear of the interior body 8 are indicated with broken lines. FIG. 2 is an external view showing the grip member 50 of the assist grip 10 shown in FIG. 1, which is pulled out from its retraction position to its grip position.

Figure 3:
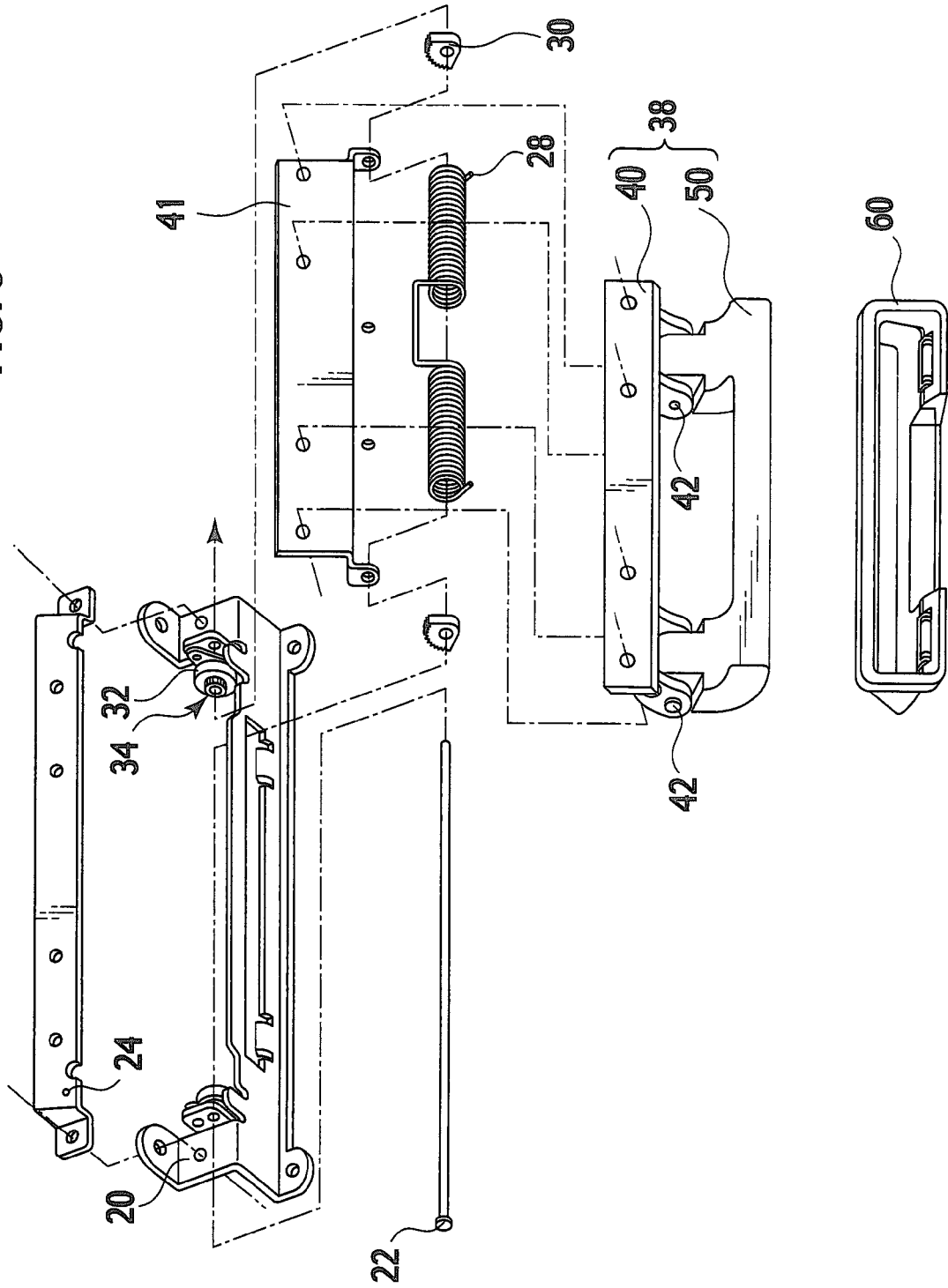
FIG. 3 is an exploded, perspective view of the assist grip.
Figure 4:
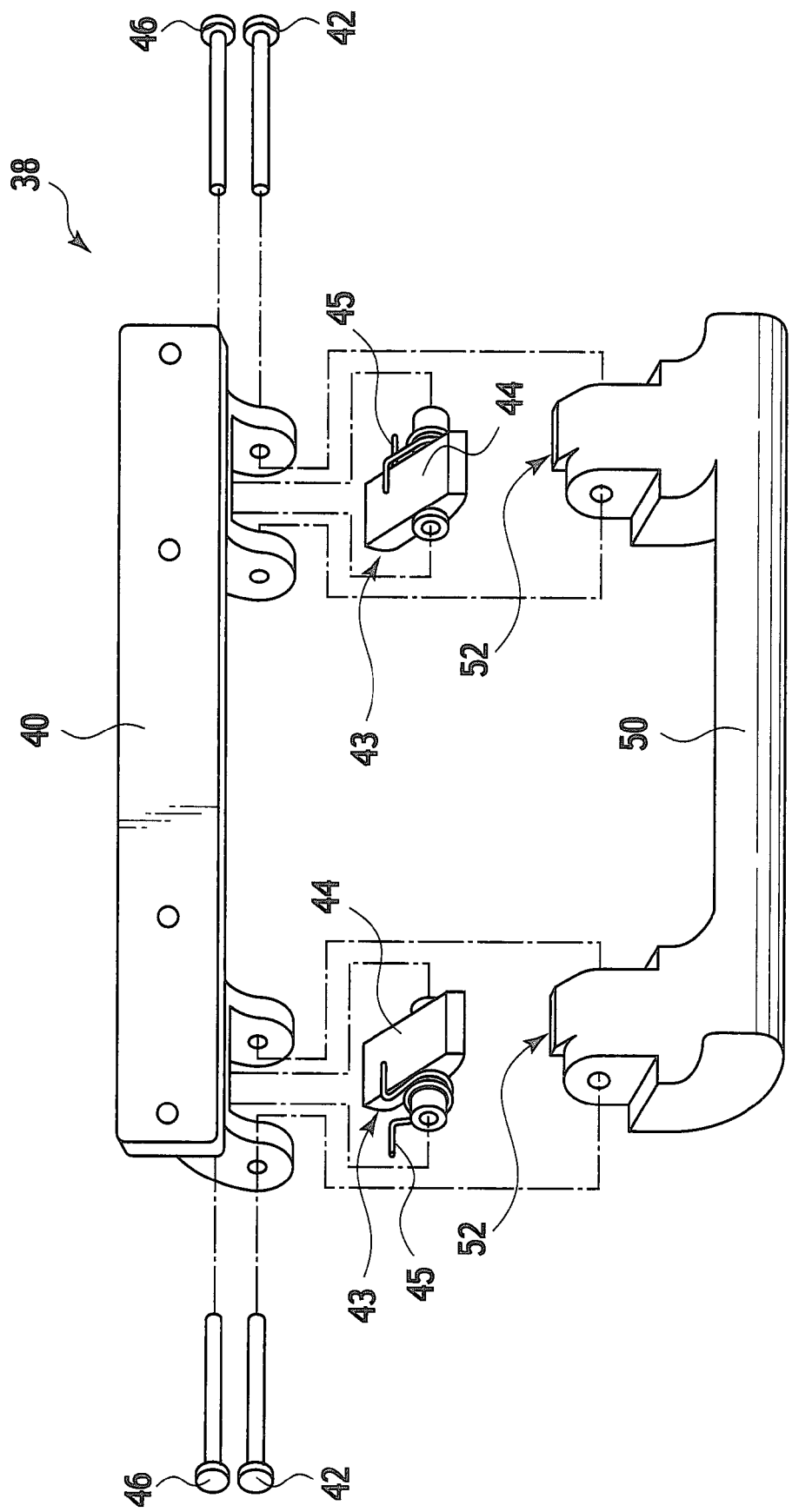
FIG. 4 is an exploded, perspective view of a handle of the assist grip shown in FIG. 3.
Figure 5:
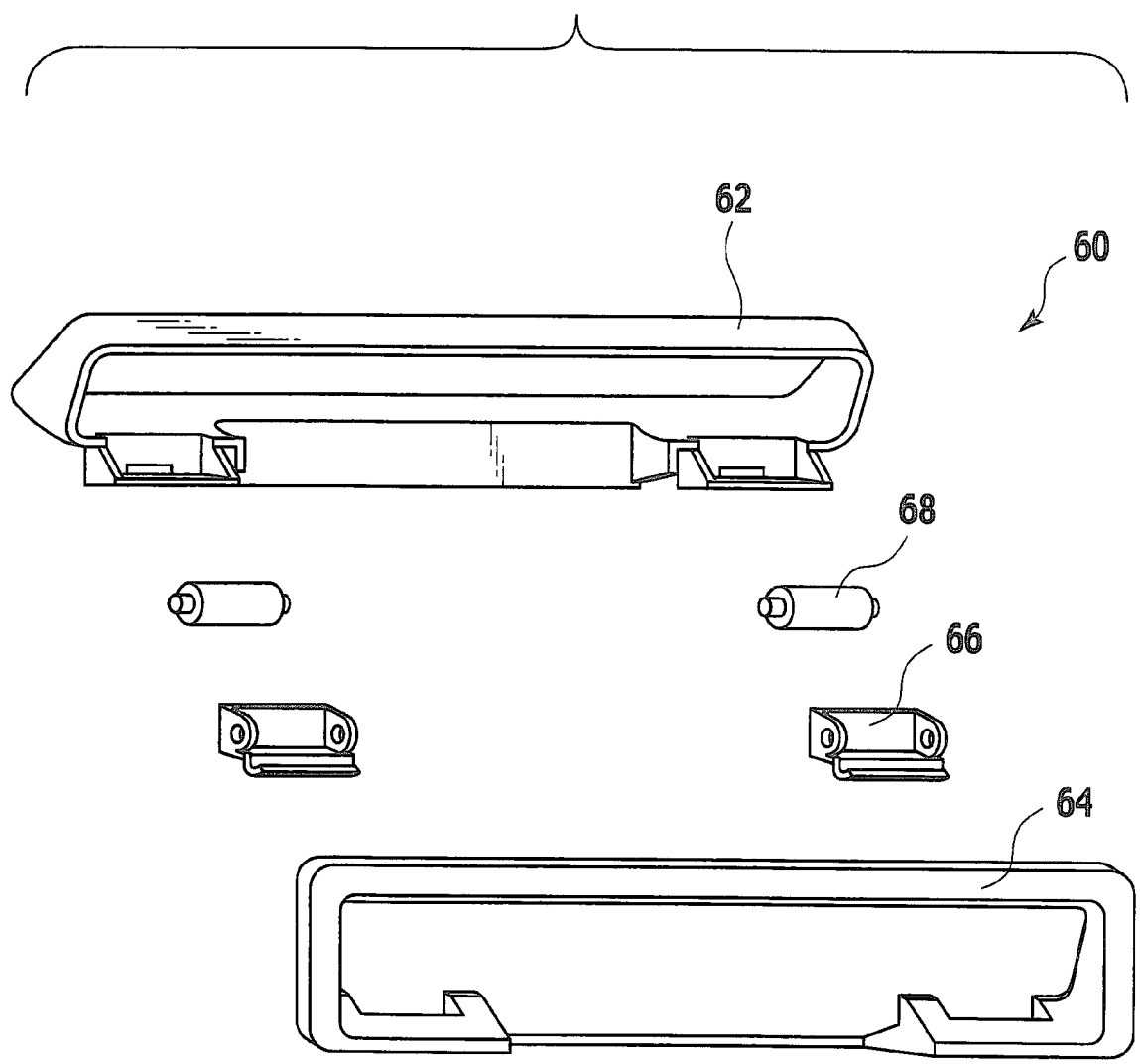
FIG. 5 is an exploded, perspective view of a case of the assist grip shown in FIG. 3.
Figure 6:
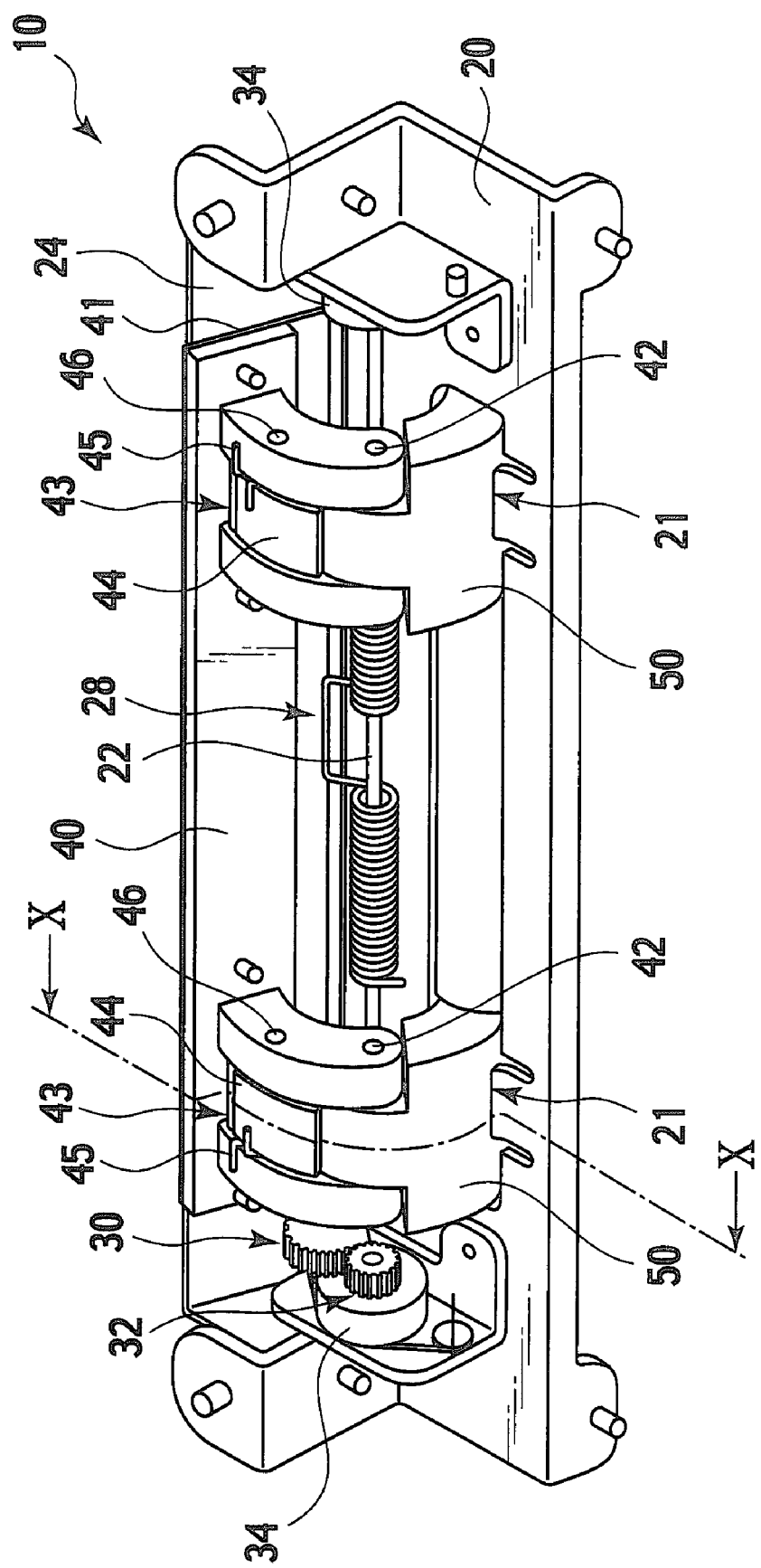
FIG. 6 is an external, perspective view of the structure of the assist grip, observed from the space part provided in the rear of the interior body.

FIG. 3 is an exploded, perspective view of the assist grip 10 according to the present invention. FIG. 4 is an exploded, perspective view of a handle 38 of the assist grip shown in FIG. 3. FIG. 5 is an exploded, perspective view of a case 60 which the handle 38 is retracted into and pulled out from. FIG. 6 is an external, perspective view of the structure of the assist grip 10, observed from the space part provided in the rear of the interior body 8.

As shown in FIG. 1, the assist grip 10 is fixed to a side rail 6 set between the outer panel of the vehicle and the interior body 8. A mechanism of the assist grip 10 configured to allow the grip member 50 to move from its retraction position to its grip position is arranged in the space part between this side rail 6 and the interior body 8. With the employment of this structure, passenger can only see, from the vehicle interior, a top portion of the grip member 50 of the assist grip and the case 60 thereof.

In addition, as shown in FIG. 2, even when the grip member is located in its grip position, the passenger can only see, from the vehicle interior, a portion of a rotation arm 40, the grip member 50 and the case 60. This makes the assist grip 10 to finish with the fine external appearance.

Next, descriptions will be provided for a configuration of the assist grip 10 according to the present invention by use of FIG. 3. As shown in FIG. 3, the assist grip 10 includes a base member 20 fixed to the side rail 6 of the vehicle. A rotation shaft 22 and a rear supporter 24 are attached to the base member 20. The rotation shaft 22 is configured to pivotally support the rotation arm 40 so as to be rotatable. The rear supporter 24 is configured to position the rotationally-biased rotation arm 40 in the retraction position.

The rotation shaft 22 is inserted through a rotation base 41, two rotation gears 30, and a retraction biasing means 28. The rotation base 41 holds the rotation arm 40. The two rotation gears 30 rotate together with the rotation base 41. The retraction biasing means 28 always biases the rotation arm 40 in a retraction direction by engaging with both of the base member 20 and the rotation base 41. In addition, the rotation arm 40 of the handle 38 is attached to the rotation base 41. The handle 38 together with the rotation base 41 is pivotally supported about the rotation shaft 22 so as to be rotatable with the base member 20 from the retraction position to the pull-out position.

For example, a torsion spring as shown in FIG. 3 may be used as the retraction biasing means 28. The handle 38 can always be rotationally biased in a direction toward its retraction position by the biasing force of the retraction biasing means 28.

Furthermore, the base member 20 includes two dampers 34 each configured to impart non-elastic resistance to the rotation arm 40 depending on its rotational speed. Damper gears 32 are fixed to the rotation shafts of the dampers 34, respectively. The damper gears 32 are configured to mesh with the rotation gears 30 rotating about the rotation shaft 22, respectively. This makes it possible to keep slow the rotational speed of the handle 38 which moves rotationally in the direction toward the retraction position due to the biasing force of the retraction biasing means 28, and concurrently to give a graceful impression to the retraction operation of the grip member 50.

Figure 7:
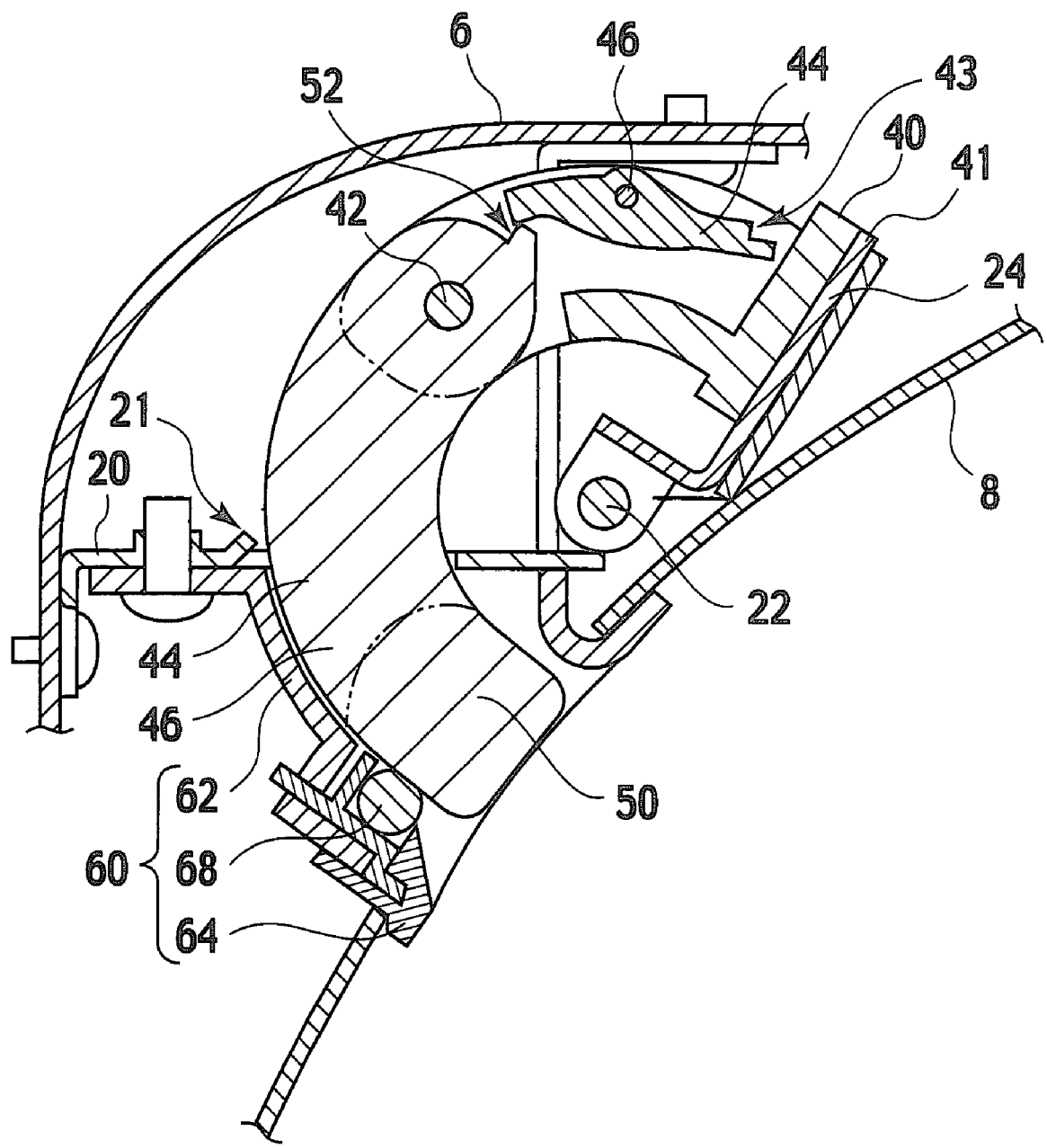
FIG. 7 is a side, cross-sectional view of the assist grip whose grip member is located in its retraction position.
Figure 8:
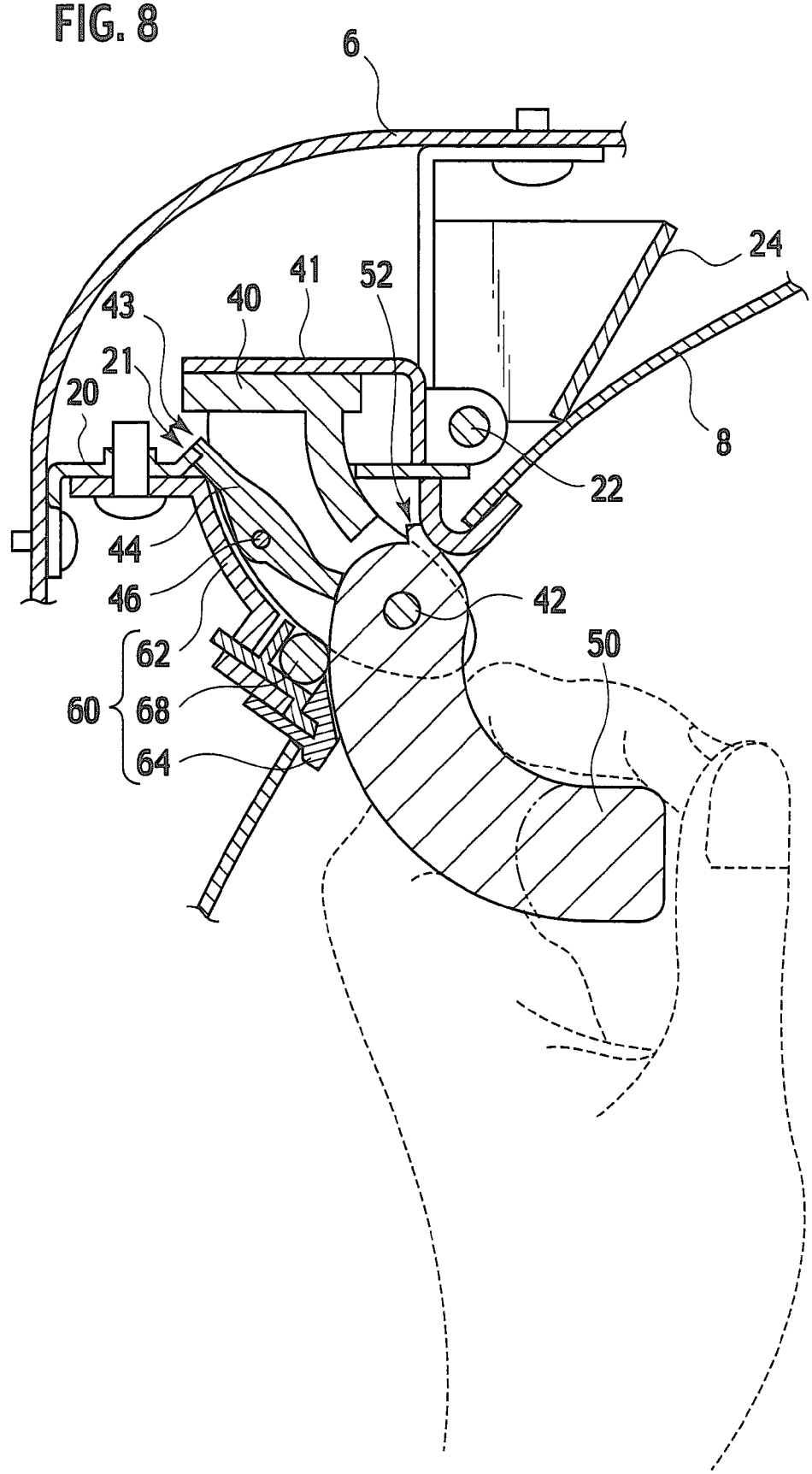
FIG. 8 is a side, cross-sectional view of the assist grip whose grip member is located in its grip position.

The grip member 50 is jointed to the rotation arm 40 by use of jointing shafts 42 for jointing the grip member 50 and the rotation arm 40 together so as to be rotatable from the ready-to-retract condition (see FIGS. 7, 9 and 10) to the grip position (see FIG. 8). Thereby, the handle 38 rotates about the rotation shaft 22 from the retraction position to the pull-out position. Concurrently, the grip member 50 rotates with the rotation arm 40 from the ready-to-retract condition to the grip position.

The handle 38 is configured to be capable of being pulled out from an opening portion opened in the middle of the case 60 to the vehicle interior. The case 60 is fixed to the base member 20.

Next, descriptions will be provided for the structure of the handle 38 by use of FIG. 4. As shown in FIG. 4, the rotation arm 40 and the grip member 50 constituting the handle 38 are rotatably jointed together by use of the two jointing shafts 42.

Swing shafts 46 configured to pivotally swingably support holding members 44 are attached to parts of the rotation arm 40, respectively. The two holding members 44 are provided in the vicinities of the two jointing shafts 42 for jointing the grip member 50 to the rotation arm 40, respectively. Engagement biasing means 45 are attached to the respective holding members 44. The engagement biasing means 45 bias the respective engagement parts 43 outward (toward the respective projection parts 21 shown in FIG. 8, to be described later). The engagement parts 43 are formed in end portions of the holding members 44, respectively. An end portion of each engagement biasing means 45 engages with its corresponding holding member 44, and the other end portion of the engagement biasing means 45 engages with the rotation arm 40.

Additionally, as shown in FIG. 4, releasing dogs 52 are formed in top portions of the grip member 50, the top portions being located in the outer peripheries of bearing parts for the jointing shafts 42, respectively. Although the engagement parts 43 are biased outward by the biasing forces of the engagement biasing means 45, the releasing dogs 52 cause the engagement parts 43 to rotate inward against the biasing forces of the engagement biasing means 45, respectively. Detailed descriptions will be provided later, for the descriptions of FIGS. 8 to 10, for a relationship among operations of the holding members 44, operations of the releasing dogs 52 and the projection parts 21 formed in the base member 20.

Next, descriptions will be provided for the structure of the case 60 by use of FIG. 5. As shown in FIG. 5, the case 60 which the handle 38 is pulled out from and retracted into includes: an inner case 62 arranged in the rear; an outer case 64 arranged being exposed to the vehicle interior; and roller cases 66 for holding the respective roller-shaped guide means 68. Each guide means 68 guides the movement of the grip member 50 while kept in contact with the grip member 50 when the grip member 50 moves between the retraction position and the grip position in response to the rotation of the rotation arm 40, and plays a function of reducing the sliding resistance.

General descriptions will be provided for how the assist grip 10 is assembled by use of FIG. 6. FIG. 6 shows the assist grip 10 in which the handle 38 is retracted into its retraction position. As shown in FIG. 6, the rear supporter 24 is fixed to the base member 20. The rotation base 41 rotationally biased by the movement of the retraction biasing means 28 is positioned in the retraction position.

The two damper 34 are attached to the base member 20. The damper gears 32 fixed to the rotation shafts of the dampers 34 engage with the rotation gears 30, respectively. This makes it possible to slowly return the rotation arm 40 and the grip member 50 attached to the rotation base 41 to the retraction position.

The grip member 50 is rotatably jointed to the rotation arm 40 by use of the two jointing shafts 42. In addition, the two holding members 44 are pivotally swingably supported with the rotation arm 40 about their respective swing shafts 46.

The engagement biasing means 45 engage with the respective holding members 44 and the rotation arm 40. The engagement biasing means 45 bias the engagement parts 43 formed in the holding members 44 outward, respectively. The engagement parts 43 engage with the projection parts 21 formed in the base member 20 when the rotation arm 40 rotate to the pull-out position by pulling out the grip member 50.

Next, descriptions will be provided for how the grip member 50 moves between the retraction position and grip position by use of side, cross-sectional views respectively of FIGS. 7 to 10. FIGS. 7 to 10 are the side, cross-sectional views taken along the X-X line of FIG. 6.

Figure 9:
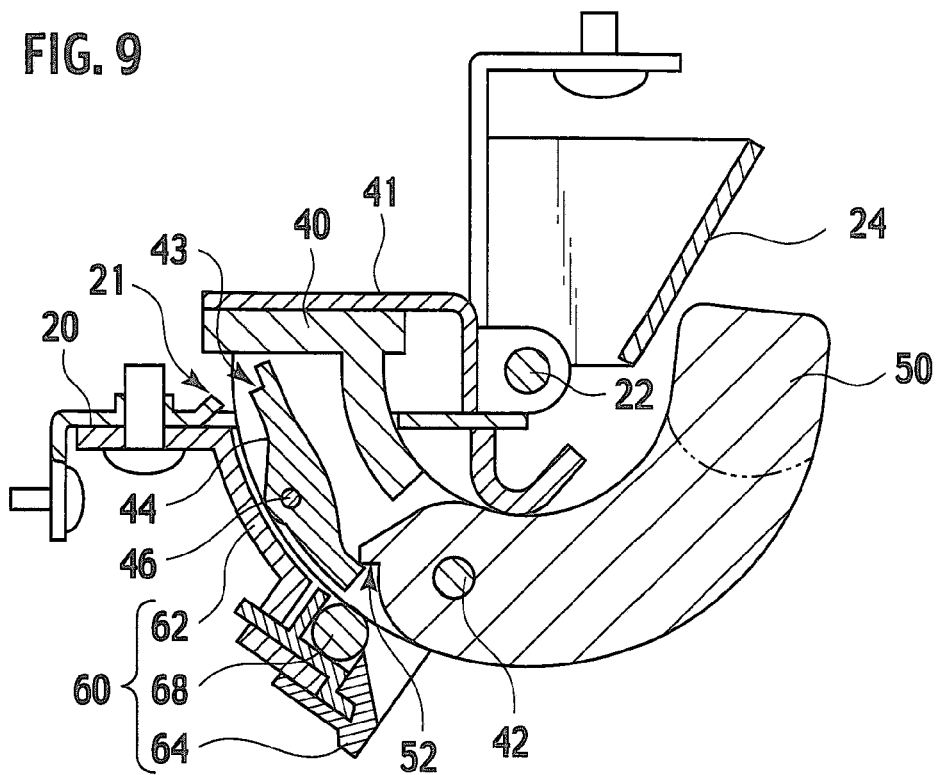
FIG. 9 is a side, cross-sectional view showing the grip member which is ready to be retracted after being caused to rotate upwardly about a jointing shaft from the grip position shown in FIG. 8.
Figure 10:
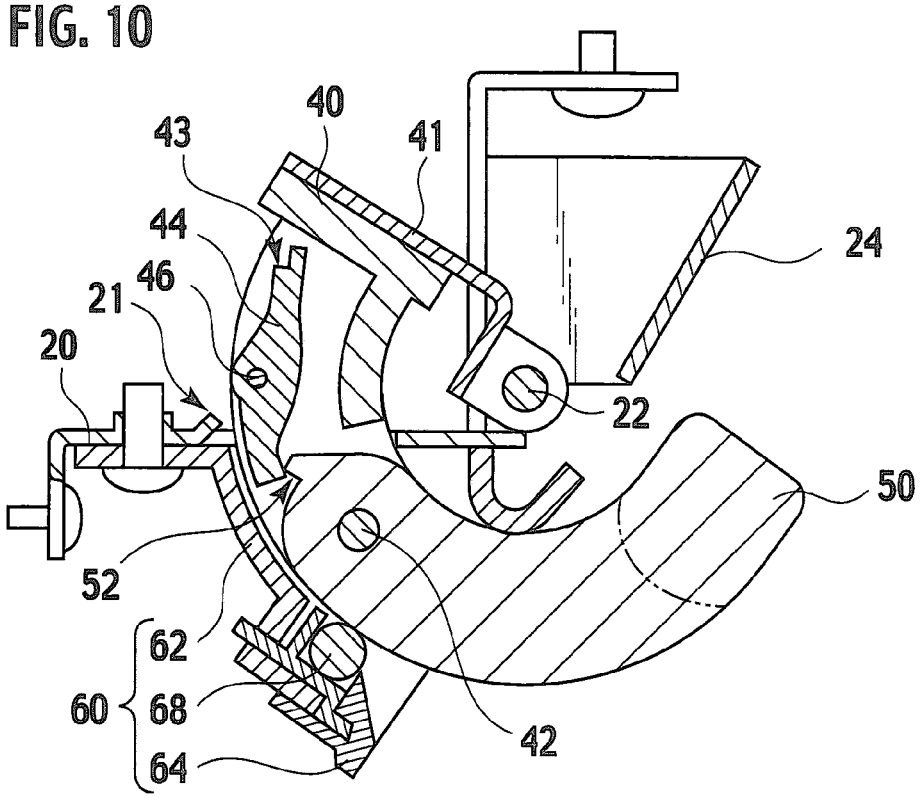
FIG. 10 is a side, cross-sectional view showing how the handle rotate toward its retraction position from its pull-out position shown in FIG. 9.

FIG. 7 is a side, cross-sectional view showing the assist grip 10 whose grip member 50 is located in the retraction position. FIG. 8 is a side, cross-sectional view showing the assist grip whose grip member 50 is located in the grip position. In addition, FIG. 9 is a side, cross-sectional view showing the assist grip whose grip member 50 is caused to rotate to the ready-to-retract position by causing the grip member 50 to rotate upward about the jointing shafts 42 from the grip position shown in FIG. 8. FIG. 10 is a side, cross-sectional view showing the assist grip whose handle 38 rotates to the retraction position from the pull-out position shown in FIG. 9. For the explanatory convenience, the illustrations respectively of the dampers 34, the damper gears 32 and the rotation gears 30 are omitted here.

When the grip member 50 is in the retraction position shown in FIG. 7, the retraction biasing means 28 biases, clockwisely in FIG. 7, the rotation base 41, the rotation arm 40 and the grip member 50. Subsequently, when the rotation base 41 comes in contact with the rear supporter 24, the rotation base 41, the rotation arm 40 and the grip member 50 are held in the halting state in the retraction position. As a result, as shown in FIGS. 7 and 1, the rotation base 41, the rotation arm 40 and the grip member 50 are put in the state of being retracted inside the interior body 8.

As shown FIG. 1, the passenger can easily pull out the grip member 50 retracted in the retraction position with fingers against the biasing force of the retraction biasing means 28. After the passenger pulls out the grip member 50 with fingers, the rotation base 41 and the rotation arm 40 start to rotate counterclockwisely in FIG. 7. Subsequently, the grip member 50 rotatably jointed to the rotation arm 40 with the rotation arm 40 comes to the grip position after rotating clockwisely with the rotation arm 40, and is thus put in the condition shown in FIGS. 2 and 8.

Descriptions will be provided for grip member 50 in the state of being pulled out to the grip position by use of FIG. 8.

When the grip member 50 is pulled out from the condition shown in FIG. 7, the rotation base 41 and the rotation arm 40 rotate to the pull-out position shown in FIG. 8. The holding members 44 to be pivotally swingably supported by the rotation arm 40 are attached to the parts of the rotation arm 40 by use of the respective swing shafts 46. The engagement parts 43 engage with the projection parts 21 of the base member 20 are formed in the ends of the holding members 44, respectively.

These engagement parts 43 are biased to the projection parts 21 by the engagement biasing means 45 shown in FIGS. 4 and 6, respectively. For this reason, when the rotation arm 40 rotate to the pull-out position as shown in FIG. 8, the engagement parts 43 engage with the projection parts 21 after getting over the projection parts 21, respectively. Thereby, the rotation arm 40 is held in the pull-out position by the movement of the holding members 44 against the biasing force of the retraction biasing means 28.

Furthermore, the grip member 50 rotatably jointed to the rotation arm 40 comes to the grip position shown in FIG. 2 after rotating clockwisely with the rotation arm 40. Accordingly, the grip member 50 is held in a position where the passenger can easily grip the grip member 50.

Next, descriptions will be provided for steps which are carried out when the grip member 50 located in the grip position is retracted by disengaging the engagement parts 43 from the respective projection parts 21 by use of FIGS. 9 and 10.

When the grip member 50 located in the grip position is retracted, the passenger pushes up the grip member 50 from the grip position to the ready-to-retract position shown in FIG. 9. Thereby, the release dogs 52 formed in the grip members 50 comes in contact with the holding members 44, and thus causes the holding members 44 to rotate in such a direction as to separate the engagement parts 43 from the projection parts 21, respectively.

When the engagement parts 43 are separated from the respective projection parts 21, the rotation arm 40 is released from the held condition, and is thus switched in the rotation condition. Hence, the rotation arm 40 rotates to the retraction position due to the biasing force of the retraction biasing means 28 (see FIG. 10).

FIG. 10 is a view showing grip member 50 being in the process of moving from the ready-to-retract position to the retraction position together with the rotation arm 40. As shown in FIG. 10, the rotation arm 40 rotates to the retraction position while being biased by the retraction biasing means 28. At this time, the rotation arm 40 rotates to the retraction position shown in FIG. 7 holding a constant angular velocity by the operations of the respective dampers 34 shown in FIGS. 3 and 6. This makes it possible to impart a graceful impression to the retraction operation of the grip member 50.

In addition, the roller-shaped guide means 68 guides the movement of the grip member 50 while rotating in contact with the grip member 50. This guiding scheme reduces the sliding resistance which occurs when the grip member 50 moves, and thus allows the grip member 50 to be pulled out and retracted smoothly.

In the case of the foregoing embodiment, the rotation arm 40 is held by engaging the holding members 44 with the respective projection parts 21 formed in the base member 20, the holding members 44 being pivotally supported by the part of the rotation arm 40 by use of the swing shafts 46. However, the present invention is not limited to the foregoing embodiment. An object of the present invention can be achieved, for example, by arranging the holding members in the base member, and concurrently by forming the projection parts for engaging with parts of the holding members in the rotation arm. Moreover, the holding members are not limited to the swing type. Instead, the holding members may be configured to switch between a holding condition and a rotation condition by use of direct-acting members such as plungers.

The assist grip according to the present invention is applicable to a retractable handle attached to a vehicle exterior, a door, a bag and the like in addition to the vehicle interior.

The entire contents of Japanese Patent Application No. 2007-247810 (filed on Sep. 25, 2007) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An assist grip to be provided in an interior of a vehicle, comprising:
    a grip member to be gripped by a passenger, the grip member configured to be capable of being pulled out from a retraction position to a grip position;
    a base member which is fixed to the vehicle and which includes a rotation shaft;
    a rotation arm pivotally supported so as to be rotatable about the rotation shaft from the retraction position to a pull-out position;
    retraction biasing means configured to always bias the rotation arm in a retraction direction; and
    a holding member configured to hold the rotation arm in the pull-out position against a biasing force of the retraction biasing means when the rotation arm is caused to rotate to the pull-out position, wherein
    the grip member is rotatably jointed to the rotation arm; and
    the grip member is provided with a release dog formed therein, the release dog configured to release the rotation arm from being held by the holding member as the grip member is rotated.

2. The assist grip according to claim 1, further comprising:
    engagement biasing means, wherein
    the holding member is pivotally swingably supported by part of the rotation arm by use of a swing shaft;
    the base member is provided with a projection part formed therein, the projection part configured to keep the rotation arm held by the holding member by engaging with an engagement part formed in part of the holding member; and
    the engagement biasing means configured to bias the engagement part toward the projection part.

3. The assist grip according to claim 1, further comprising;
    guide means configured to guide a movement of the grip member while kept in contact with the grip member, when the grip member moves between the retraction position and the grip position with the rotation arm.

4. The assist grip according to claim 2, further comprising;
    guide means configured to guide a movement of the grip member while kept in contact with the grip member, when the grip member moves between the retraction position and the grip position with the rotation arm.

* * * * *